(12) United States Patent
Eurez et al.

(10) Patent No.: US 8,562,052 B2
(45) Date of Patent: Oct. 22, 2013

(54) COMPONENT ENGAGEMENT APPARATUS FOR USE IN AUTOMATED SYSTEMS AND METHODS OF ASSEMBLING SAME

(75) Inventors: Robert Eurez, Ostrander, OH (US); Tommy Watkins, Urbana, OH (US); James Van Voorhis, Bellefontaine, OH (US); Charlie Nelson, Marksville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 3 days.

(21) Appl. No.: 13/305,580

(22) Filed: Nov. 28, 2011

(65) Prior Publication Data

US 2013/0134727 A1 May 30, 2013

(51) Int. Cl.
*B25J 15/06* (2006.01)
(52) U.S. Cl.
USPC .................................. 294/185; 394/65; 394/2
(58) Field of Classification Search
USPC ..................... 294/185, 65, 2; 901/40; 414/737
See application file for complete search history.

(56) References Cited

U.S. PATENT DOCUMENTS

| | | | |
|---|---|---|---|
| 2,353,189 A * | 7/1944 | Rundell | 294/65 |
| 4,131,043 A | 12/1978 | Colman et al. | |
| 4,445,678 A | 5/1984 | George | |
| 4,453,303 A * | 6/1984 | Leddet | 29/407.05 |
| 4,852,237 A * | 8/1989 | Tradt et al. | 29/407.05 |
| 5,752,729 A * | 5/1998 | Crozier et al. | 294/2 |
| 6,000,688 A | 12/1999 | Giangrasso | |
| 6,068,541 A | 5/2000 | Dwyer | |
| 6,435,497 B1 | 8/2002 | Borter | |
| 6,681,464 B1 | 1/2004 | Dupuis et al. | |
| 6,993,821 B2 | 2/2006 | Ahti et al. | |
| 7,044,706 B2 * | 5/2006 | Jung | 414/737 |
| 7,146,705 B2 | 12/2006 | Ahti et al. | |
| 7,900,898 B2 | 3/2011 | Wampler, II | |
| 8,025,277 B2 * | 9/2011 | Lin et al. | 269/55 |
| 8,256,813 B2 * | 9/2012 | Hsieh et al. | 294/183 |

* cited by examiner

*Primary Examiner* — Saul Rodriguez
*Assistant Examiner* — Gabriela Puig
(74) *Attorney, Agent, or Firm* — Armstrong Teasdale LLP (57) ABSTRACT

A component engagement apparatus for use in automated systems is provided. The engagement apparatus includes a main body and at least one retaining member coupled to the main body. The retaining member is configured to couple a component to the engagement apparatus such that the component is retained within the component engagement apparatus in a first predefined position. A plurality of alignment members are coupled to the main body such that each of the alignment members are positioned a predefined distance from the retaining members. The alignment members are each configured to align the component within the engagement apparatus when the component moves, via gravity, from the first predefined position to a second predefined position.

18 Claims, 6 Drawing Sheets

COMPONENT ENGAGEMENT APPARATUS FOR USE IN AUTOMATED SYSTEMS AND METHODS OF ASSEMBLING SAME

BACKGROUND

The field of the invention relates generally to automated systems and, more particularly, to a component engagement apparatus that may be used in automated systems.

Automated systems use electromechanical machines, such as robots, to transfer components from a first location to a second location within an assembly line. For example, robots may be used to transfer automobile front floor panels from a cart to a stamping cart in such a manner that the front floor panels are sealed when they are positioned within the stamping cart. Such robots may include a floor panel engagement apparatus that retains the floor panel therein such that the floor panel may be transferred to the desired location. The engagement apparatus may include at least one engagement member, such as a clamp, that retains the floor panel within the engagement apparatus when the floor panel is being transferred. At least some known engagement apparatuses may also include a plurality of alignment pins that are inserted within a corresponding opening formed on the floor panel to accurately align the floor panel relative to the engagement apparatus. Accurately aligning the floor panel relative to the engagement apparatus enables the floor panel to be transferred to the stamping cart with an accurate alignment.

However, in some instances, an alignment pin may not be properly received within the floor panel opening. For example, in some instances, the floor panel may be positioned such that the pin is unable to be fully inserted within the opening. As such, the pin may be positioned, for example, adjacent to the opening and may cause the floor panel to be misaligned relative to the engagement apparatus, and as such, the floor panel may not be properly aligned when it is subsequently positioned within the stamping cart. Accordingly, in such an instance, when the floor panel is not properly aligned within the stamping cart, the floor panel may not be sealed therein, and down times and rework may be required. More specifically, the down time associated with work drops within the assembly line may increase and the overall efficiency of the assembly line may be substantially reduced.

SUMMARY

A component engagement apparatus for use in automated systems is provided. The engagement apparatus includes a main body and at least one retaining member coupled to the main body. The retaining member is configured to couple a component to the engagement apparatus such that the component is retained within the component engagement apparatus in a first predefined position. A plurality of alignment members are coupled to the main body such that each of the alignment members are positioned a predefined distance from the retaining members. The alignment members are each configured to align the component within the engagement apparatus when the component moves, via gravity, from the first predefined position to a second predefined position.

An automated system is provided. The automated system includes an electromechanical machine that is configured to move a component from a first location to a second location. A component engagement apparatus is coupled to the electromechanical machine. The engagement apparatus includes a main body and at least one retaining member coupled to the main body. The retaining member is configured to couple the component to the engagement apparatus such that the component is retained within the component engagement apparatus in a first predefined position. A plurality of alignment members are coupled to the main body such that each of the alignment members are positioned a predefined distance from the retaining members. The alignment members are each configured to align the component within the engagement apparatus when the component moves, via gravity, from the first predefined position to a second predefined position.

A method of assembling a component engagement apparatus for use in automated systems is provided. At least one retaining member is coupled to a main body. The retaining member is configured to couple a component to the engagement apparatus such that the component is retained within the engagement apparatus in a first predefined position. A plurality of alignment members are coupled to the main body such that each of the alignment members are positioned a predefined distance from the retaining member. The alignment members are configured to align the component within the engagement apparatus when the component moves, via gravity, from the first predefined position to a second predefined position.

A component engagement apparatus for aligning a component in two directions is provided. The apparatus includes a main body rotatable from a first position to a second position. At least two arms extend from the main body to define a channel therebetween that receives a portion of the component therein to align the component in a first direction when the main body is in the first position. The apparatus also includes at least one engagement device extends from the main body. The engagement device selectively secures the component to the main body when the component is aligned in the first direction, and releases the component when the main body is in the second position to enable the component to move parallel to a longitudinal axis of the channel. A finger extends from the main body and is positioned to receive the moving component at a point where the component is aligned in the second direction.

A method of using a component engagement apparatus to align a component in two directions is provided. A main body is rotated from a first position to a second position. A portion of the component is received within a channel defined between at least two arms extending from the main body to align the component in a first direction when the main body is in the first position. The component is selectively secured, via at least one engagement device, to the main body when the component is aligned in the first direction. The component is released when the main body is in the second position to enable the component to move parallel to a longitudinal axis of the channel. The moving component is received at a point where the component is aligned in the second direction, via a finger that extends from the main body.

DETAILED DESCRIPTION

The exemplary apparatus, systems, and methods described herein overcome at least some known disadvantages of at least some known automated systems that are used to transfer machine components, such as automobile front floor panels. The embodiments described herein provide a component engagement apparatus for use in automated systems. The exemplary engagement apparatus includes a main body and at least one retaining member coupled to the main body. The retaining member is configured to couple a component, such as a front floor panel, to the engagement apparatus such that the panel is retained within the component engagement apparatus in a first predefined position. A plurality of alignment members are coupled to the main body such that each of the alignment members are positioned a predefined distance from the retaining members. The alignment members align the panel within the engagement apparatus when the panel moves, via gravity, from the first predefined position to a second predefined position. By using the alignment members, pins are no longer inserted into openings formed in the panels. Moreover, the alignment members enable the panel to be properly aligned within the engagement apparatus. When a component, such as the floor panel, is properly aligned within the engagement apparatus, the floor panel may be accurately aligned within a stamping cart such that the floor panel is properly sealed therein. Accordingly, down time associated with work drops within the assembly line is facilitated to substantially decrease, while the overall efficiency of the assembly line may substantially increase.

Figure 1:
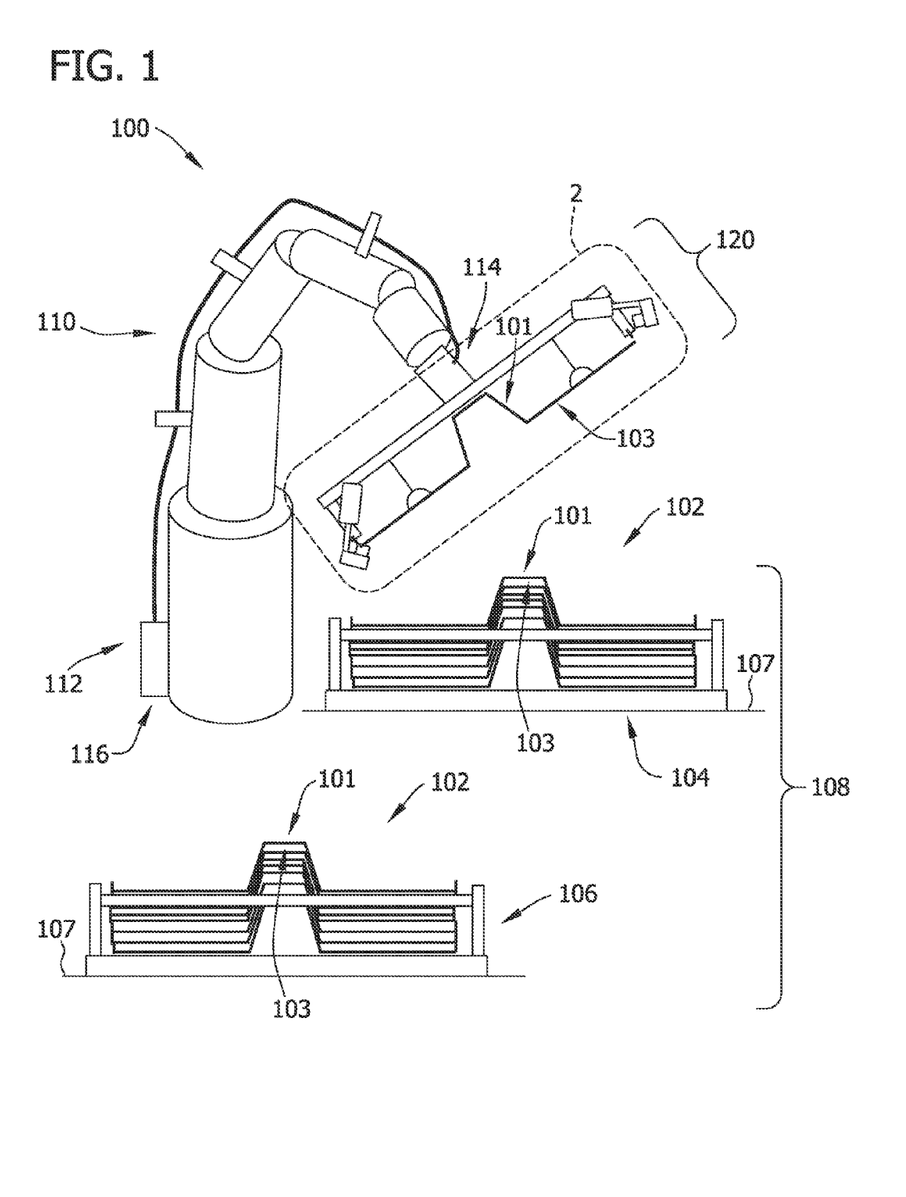
FIG. 1 is a schematic perspective view of an exemplary embodiment of an automated system.

FIG. 1 is a diagram of an exemplary embodiment of an automated system 100 that is configured to move at least one component 102 from a first location 104 to a second location 106 within an assembly line 108. In the exemplary embodiment, component 102 is a front floor panel of an automobile (not shown) and includes an outer surface 101 and an inner surface 103. Alternatively, component 102 may be any other type of component that is being transferred from first location 104 to second location 106 and that enables system 100 to function as described herein. Moreover, in the exemplary embodiment, first location 104 is defined as a cart that is configured to contain components 102 such that the components are positioned (or stacked) on top of one another, and second location 106 is defined as a stamping cart wherein components 102 are positioned (or stacked) on top of one another such that each component 102 may be sealed therein. Each cart 104 and 106 are positioned on a planar surface 107, such as a floor.

It should be noted that while the exemplary embodiment uses automated system 100 to transfer a front floor panel 102 of an automobile from one cart 104 to a stamping cart 106, the present disclosure is not limited to systems and/or assembly lines related to automobiles. One of ordinary skill in the art will appreciate that the current disclosure may be used in connection with other types of systems and/or assembly lines.

Automated system 100, in the exemplary embodiment, includes an electromechanical machine 110. More specifically, in the exemplary embodiment, electromechanical machine 110 is a mechanical intelligent agent, such as a robot, that can perform various tasks automatically and/or with guidance, such as by remote control. Electromechanical machine 110 includes a first portion 112 and a second portion 114, wherein a computing device 116 is included within first portion 112 and a component engagement apparatus 120 is coupled to second portion 114.

Computing device 116 includes a processor (not shown) and a memory device (not shown) The term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor." In the exemplary embodiment, the memory device includes one or more devices that enable information, such as executable instructions and/or other data, to be stored and retrieved. Moreover, in the exemplary embodiment, the memory device includes one or more computer readable media, such as, without limitation, dynamic random access memory (DRAM), static random access memory (SRAM), a solid state disk, and/or a hard disk. In the exemplary embodiment, the memory device stores, without limitation, application source code, application object code, configuration data, additional input events, application states, assertion statements, validation results, and/or any other type of data.

In the exemplary, embodiment, the processor may be programmed by encoding an operation using one or more executable instructions and providing the executable instructions in the memory device. For example, in the exemplary embodiment, the processor may be programmed with various mechanical tasks related to having electromechanical machine 110 lift and move at least one front floor panel 102 from first cart 104 to stamping cart 106 at various time intervals. Computing device 116 may also include a user interface (not shown) that enables an operator to input various tasks and that enables electromechanical machine 110 to be manually controlled by the operator.

Alternatively, computing device 116 may also be positioned external to electromechanical machine 110 and may communicate remotely with electromechanical machine 110. For example, in such an embodiment, various connections may be available between computing device 116 and electromechanical machine 110, including but not limited to an electrical conductor, a low-level serial data connection, such as Recommended Standard (RS) 232 or RS-485, a high-level serial data connection, such as Universal Serial Bus (USB), a field bus, a process field bus (PROFIBUS®), or an Institute of Electrical and Electronics Engineers (IEEE®) 1394, a parallel data connection, such as IEEE® 1284 or IEEE® 488, a short-range wireless communication channel such as BLUETOOTH®, and/or a private (e.g., inaccessible outside steam generation system 100) network connection, whether wired or wireless. IEEE is a registered trademark of the Institute of Electrical and Electronics Engineers, Inc., of New York, N.Y. BLUETOOTH is a registered trademark of Bluetooth SIG, Inc. of Kirkland, Wash. PROFIBUS is a registered trademark of Profibus Trade Organization of Scottsdale, Ariz.

During operation, electromechanical machine 110 couples to front floor panel 102, via engagement apparatus 120, and selectively moves front floor panel 102 from cart 104 to stamping cart 106. As explained in more detail below, when floor panel 102 is coupled to engagement apparatus 120, engagement apparatus 120 aligns floor panel 102 relative to engagement apparatus 120. More specifically, floor panel 102 is aligned within engagement apparatus 120 such that floor panel 102 may be properly aligned within stamping cart 106 when floor panel 102 is moved to and selectively positioned within cart 106. Moreover, when floor panel 102 is properly positioned within cart 106, floor panel 102 is then properly sealed therein. Accordingly, down time associated with work drops within assembly line 108 are facilitated to substantially decrease and the overall efficiency of assembly line 108 may substantially increase.

Figure 2:
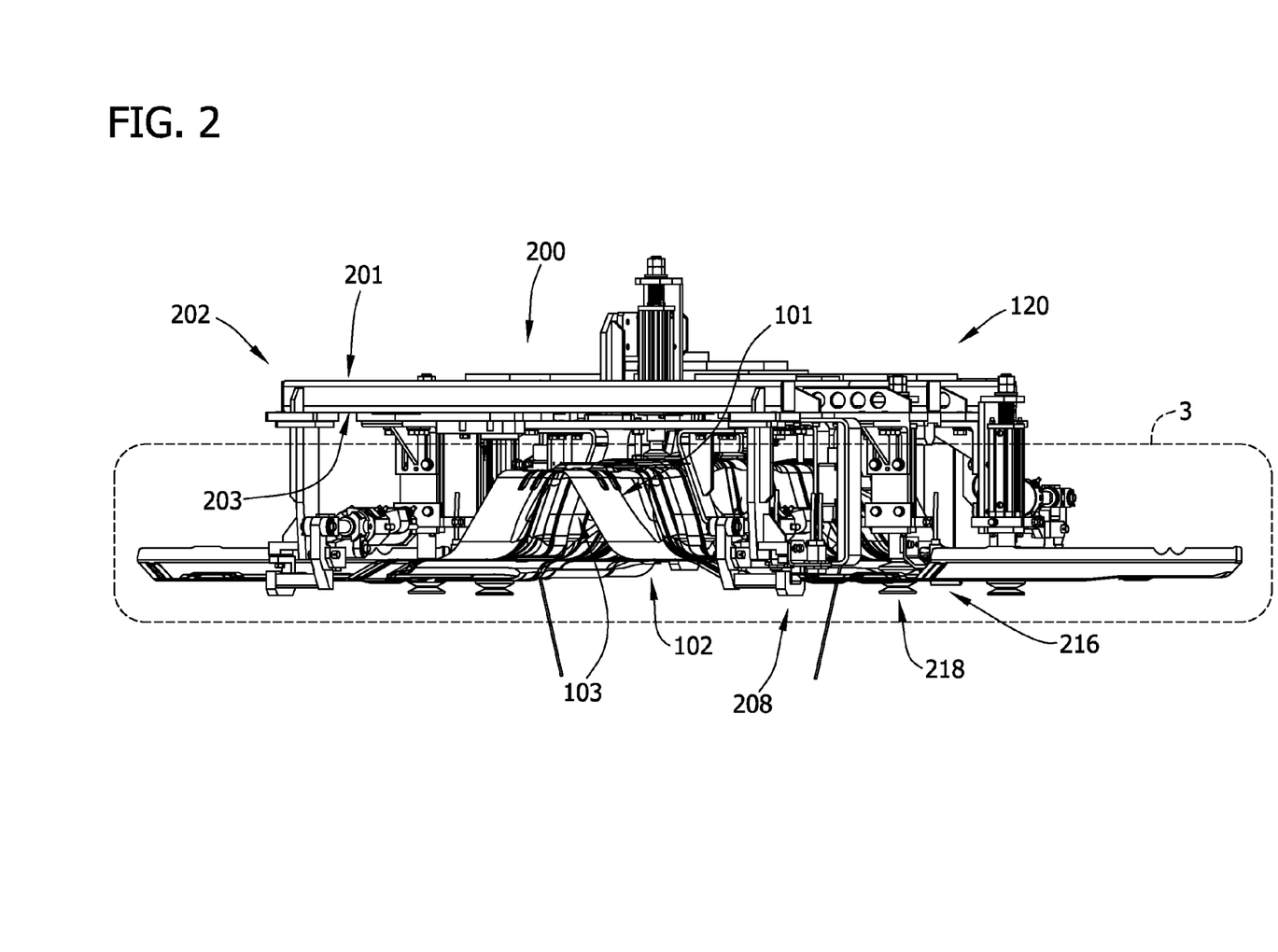
FIG. 2 is schematic perspective view of an exemplary embodiment of a component engagement apparatus that may be used with the automated system shown in FIG. 1 and taken from area 2.
Figure 3:
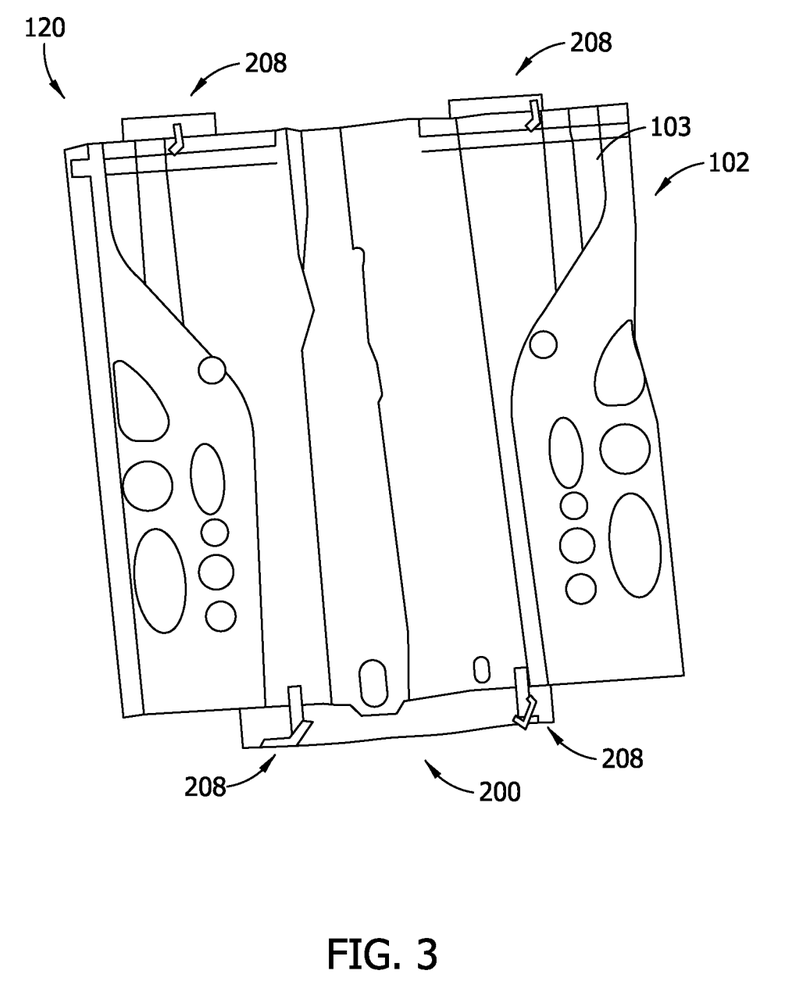
FIG. 3 is a schematic perspective view of the component engagement apparatus shown in FIG. 2 and taken from area 3.
Figure 4:
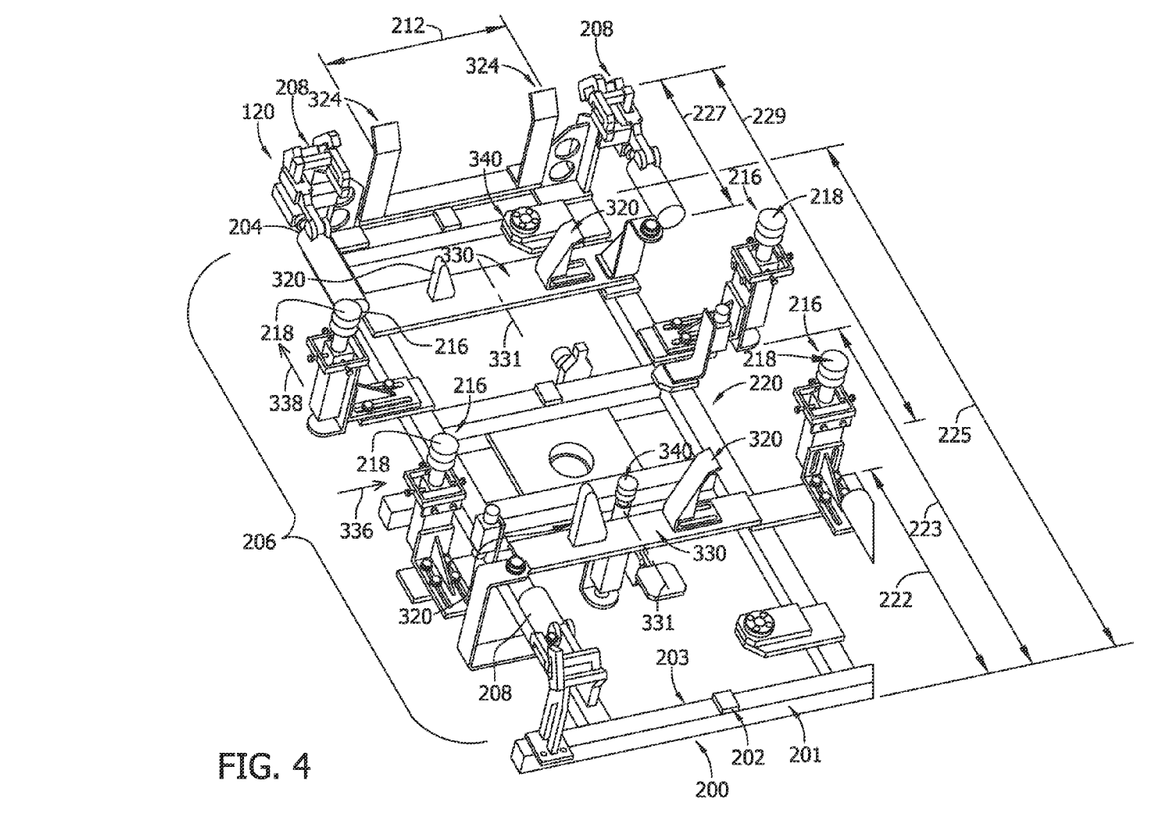
FIG. 4 is a schematic perspective view of the component engagement apparatus shown in FIG. 2
Figure 5:
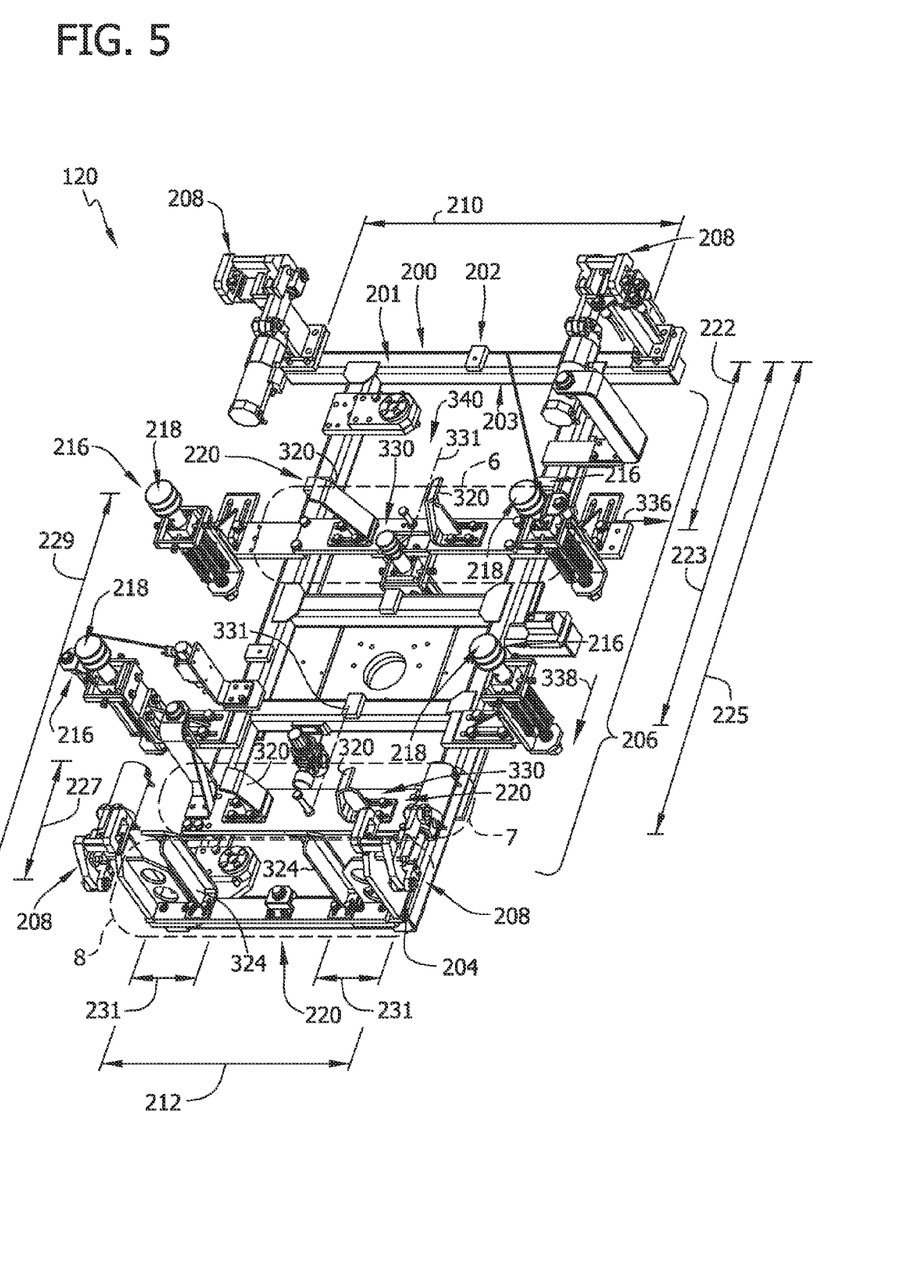
FIG. 5 is a schematic perspective view of the component engagement apparatus shown in FIG. 2.
Figure 6:
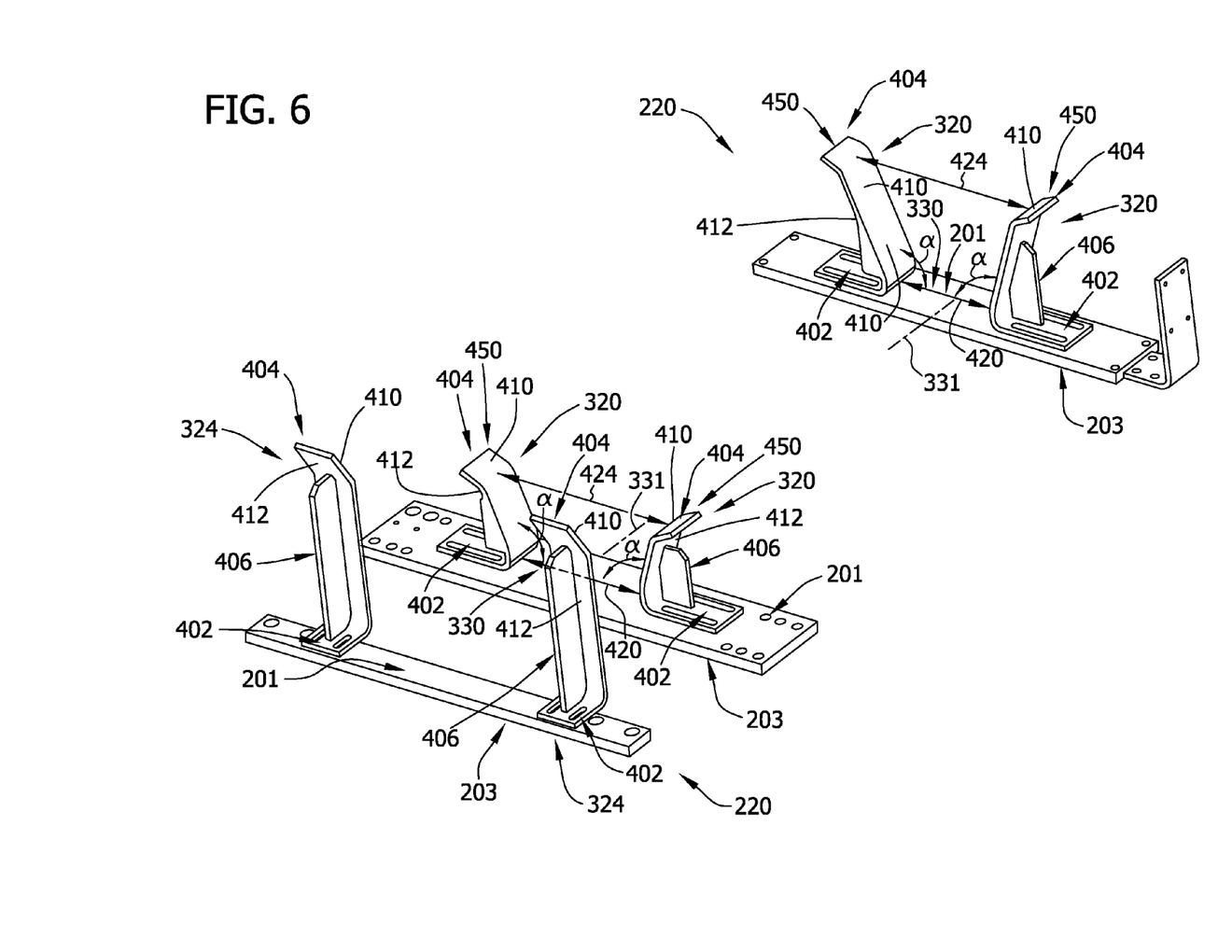
FIG. 6 is an enlarged schematic perspective view of exemplary alignment members that may be used with the component engagement apparatus shown in FIG. 5 and taken from areas 6, 7, and 8.

FIG. 2 is a perspective view of component engagement apparatus 120 and taken from area 2 (shown in FIG. 1). FIG. 3 illustrates a perspective view of component engagement apparatus 120 and taken from area 3 (shown in FIG. 2). FIGS. 4 and 5 each illustrate a perspective view of component engagement apparatus 120. FIG. 6 is an enlarged schematic perspective view of a plurality of alignment members 220 that may be used with component engagement apparatus 120 and taken from areas 6, 7, and 8 (shown in FIG. 5). Referring to FIGS. 2, 3, 4, and 5, engagement apparatus 120 includes a main body 200 having a first end portion 202 and a second end portion 204. Main body 200 also includes a middle portion 206 between first and second end portions 202 and 204, respectively.

In the exemplary embodiment, main body 200 is substantially rectangular shape and includes an inner surface 201 and an outer surface 203. The outer surface 203 may be coupled to electromechanical machine 110 as shown in FIG. 1. Alternatively, main body 200 may have any other shape that enables automated system 100 (shown in FIG. 1) and/or engagement apparatus 120 to function as described herein. Main body 200 may be a single unitary piece or main body 200 may include various portions that are coupled together to form a unitary piece. Moreover, in the exemplary embodiment, main body 200 is substantially rigid and is generally fabricated from a metal or a metal alloy, such as steel. Alternatively, main body 200 may be fabricated from any other type of material that enables automated system 100 and/or engagement apparatus 120 to function as described herein.

At least one retaining member 208, in the exemplary embodiment, is coupled to main body 200. Retaining members 208 may be removably coupled to main body 200 or retaining members 208 may be integrally formed with main body 200. In the exemplary embodiment, four retaining members 208 extend from main body inner surface 201 such that two retaining members 208 are positioned on main body first end portion 202 and two retaining members 208 are positioned on main body second end portion 204. Retaining members 208 that are positioned on main body first end portion 202 are spaced a distance 210 from each other. Retaining members 208 positioned on main body second end portion 204 are spaced a distance 212 apart from each other. Distances 210 and 212 may vary or be variably adjusted depending on the type of floor panel 102 being moved, such as the make and/or model of automobile associated with floor panel 102.

In the exemplary embodiment, each retaining member 208 is a clamp fabricated from steel. Members 208 are configured to couple floor panel 102 to component engagement apparatus 120 such that component 102 is securely retained therein (as shown in FIGS. 2 and 3). More specifically, electromechanical machine 110, via computing device 116 (shown in FIG. 1), is selectively operable to facilitate operative opening and closing features of each retaining member 208 via features that include, without limitation, receiving permissive inputs, transmitting permissive outputs, and transmitting opening and closing commands, such that each retaining member 208 may be selectively positioned in an open or closed position. For example, when retaining members 208 are in an open position, retaining members 208 are not in contact with floor panel 102 and floor panel 102 may be selectively released from engagement apparatus 120. When retaining members 208 are in a closed position, retaining members 208 are selectively in position to engage floor panel 102 such that floor panel 102 is securely coupled within engagement apparatus 120. In the exemplary, embodiment, each retaining member 208 selectively maintains component 102 in engagement apparatus 120 in various positions, such as but not limited to a substantially horizontal position with respect to planar surface 107 and a substantially vertical position with respect to planar surface 107.

At least engagement device 216 is coupled to main body inner surface 201. More specifically, in the exemplary embodiment, four engagement devices 216 are coupled to main body middle portion 206. In the exemplary embodiment, engagement devices 216 are suction cups that use negative fluid pressure, such as negative air pressure, to adhere to component 102. Moreover, in the exemplary embodiment, each engagement device 216 has a substantially curved surface 218. Electromechanical machine 110, via computing device 116, controls operation of each engagement device 216 via features that include, without limitation, receiving permissive inputs, transmitting permissive outputs, and transmitting commands such that each engagement device 216 may be selectively positioned in contact with and adhere to component 102. For example, when each engagement device 216 is pressed against a portion of component 102, the volume of the space between each engagement device 216 and component 102 is substantially reduced, thereby causing the fluid, such as air, between engagement device 216 and component 102 to be expelled past engagement device 216. As such, each engagement device 216 is enabled to adhere to component 102. Alternatively, engagement device 216 may be connected to a vacuum source (not shown) that may be operatively on to secure component 102 within engagement apparatus 120 or operatively off to release component 102 from within engagement apparatus 120. In the exemplary embodiment, engagement devices 216 may be fabricated from polymers of high molecular mass, such as plastics and/or elastomers, such as rubber. Alternatively, rather than suction cups, engagement devices 216 may be an electromagnet, clamp, or any other device configured to selectively secure or release component 102 from engagement apparatus.

Referring to FIGS. 2, 4, 5, and 6, a plurality of alignment members 220 are coupled to main body 200, and each alignment member 220 is configured to align floor panel 102 within component engagement apparatus 120. More specifically, in the exemplary embodiment, six alignment members 220 are coupled to main body inner surface 201, wherein four of the alignment members 220 are arms 320 that extend from main body middle portion 206 and two of the alignment members 220 are fingers 324 that extend from main body second end portion 204. In the exemplary embodiment, at least two of the arms 320 are positioned on main body middle portion 206 such that a channel 330 is defined therebetween, wherein channel 330 has a longitudinal axis 331 defined therein. In the exemplary embodiment, channel 330 is substantially v-shaped. For example, in the exemplary embodiment, a distance 420 between the arms 320 that are adjacent to main body 200 is less than the distance 424 between the arms 320 adjacent each end 450 of the arms 320. Alternatively, channel 330 may be any other suitable shape that enables apparatus 120 to function as described herein.

Moreover, in the exemplary embodiment, each arm 320 extending from main body middle portion 206 is positioned a distance 222 or distance 223 from each retaining member 208 extending from main body first end portion 202. Each finger 324 extending from main body second end portion 204 is positioned a distance 225 from each retaining member 208 extending from main body first end portion 202. Each arm 320 extending from main body middle portion 206 is positioned a distance 227 or a distance 229 from each retaining member 208 extending from main body second end portion 204. Each finger 324 extending from main body second end portion 204 is positioned a distance 231 from each retaining member 208 extending from main body second end portion 204. Distances 222, 223, 225, 227, 229 and 231 may vary depending on the type of floor panel 102 being moved by system 100. Moreover, the number of alignment members 220, the size, and/or the relative location of each alignment member 220 on main body 200 is variably selected based on the type of floor panel 102 being moved by automated system 100.

In the exemplary embodiment, each alignment member 220 includes a first portion 402, a second portion 404, and a third portion 406. In the exemplary embodiment, first portion 402 is directly coupled to main body inner surface 201 such that first portion 402 overlays a portion of main body inner surface 201. Second portion 404 and third portion 406 each extend outwardly from main body inner surface 201. More specifically, the second portion 404 of each alignment member 220 that are arms 320 on main body middle portion 206 extends outwardly from main body inner surface 201 at an angle a, and the second portion 404 of each alignment member 220 that are fingers 324 on main body second end portion 204 is substantially perpendicular to main body inner surface 201. Similarly, third portion 406 of each alignment member 220 is positioned substantially perpendicular to main body inner surface 201. Moreover, in the exemplary embodiment, each alignment member second portion 404 includes an inner surface 410 and an outer surface 412. The shape of each alignment member 220 may vary based on the type of floor panel 102 being moved by system 100. The portions of main body 200 that alignment members 220 are coupled to may be integrally formed with main body 200 or removably coupled to main body 200.

During operation, electromechanical machine 110 selectively moves floor panel 102 from cart 104 (shown in FIG. 1) to stamping cart 106 (shown in FIG. 1). In a non-limiting example, the component engagement apparatus 120 is positioned above floor panel 102 in cart 104 and is in a first position or substantially horizontal to the planar surface 107 such that component engagement apparatus 120 may couple to floor panel 102. The engagement device 216 engages the floor panel outer surface 101 such that floor panel 102 may be coupled within engagement apparatus 120. For example, engagement device 216 secures the floor panel 102 and retracts a protruding portion 334 of floor panel 102 in channel 330 such that arms 320 engage portion 334 and guide portion 334 in the channel 330 such that floor panel 102 is aligned in a first direction 336. More specifically, the open end 340 of the v-shape of channel 330 provides a large target for inserting protruding portion 334 of floor panel 102. The v-shape of channel 330 then funnels the protruding portion 334 into channel 330, wherein floor panel is aligned (as shown in FIG. 2). This configuration enables apparatus 120 to align floor panel 102 that may not be appropriately positioned within cart 106. Retaining members 208 are then selectively positioned in a closed position such that component 102 is secured within engagement apparatus 120 and engagement devices 216 may then be released from adhering to floor panel 102. Floor panel 102 is then retained within engagement apparatus 120 aligned in a first direction 336.

As shown in FIG. 2, when floor panel 102 is aligned in the first direction 336 within engagement apparatus 120, at least a portion of component 102 is positioned against and is in contact with the four arms 320 extending from main body middle portion 206. More specifically, at least a portion of component outer surface 101 is positioned against and is maintained in contact with inner surface 410 of each of the four arms 320 that extend from main body middle portion 206.

The electromechanical machine 110 selectively positions component engagement apparatus 120 in a second, substantially vertical, position with respect to the planar surface 107, as shown in FIG. 3. While engagement apparatus 120 is in the second position, the retaining members 208 selectively reposition to an open position and floor panel 102 is released. Floor panel 102 slides, for example, via gravity, within engagement apparatus 120, from the first position to a second position where the floor panel 102 is aligned in a second direction 338. In the second position, at least a portion of floor panel 102 is positioned against and in contact with the inner surface 410 of each of the four arms 320 that are extending from main body middle portion 206 and at least a portion of floor panel 102 is now also in contact with the inner surface 410 of each of the two fingers 324 that are extending from main body second end portion 204. More specifically, an end (not shown) of floor 102 contacts and is positioned against inner surface 410 of each of the two fingers 324 extending from main body second end portion 204.

When floor panel 102 is aligned in the second direction, retaining members 208 close and floor panel 102 is secured within engagement apparatus 120. Moreover, when floor panel 102 moves from the first position to the second position, floor panel 102 is aligned in both the first and second directions 336 and 338, respectively. Accordingly, an operation may be performed on the floor panel 102. In a non-limiting example, sealant may be applied to the floor panel 102. In another non-limiting example, the electromechanical machine 110 may position the floor panel 102 on a rack or table for an operation to be performed on the floor panel 102. For example, the electromechanical machine 110 may move engagement apparatus 120 above stamping cart 106. When engagement apparatus 120 is positioned above stamping cart 106, retaining members 208 selectively open and floor panel 102 is released. More specifically, floor panel 102 is released from within engagement apparatus 120 and is positioned within stamping cart 106. By having floor panel 102 be aligned in both the first and second directions 336 and 338, respectively, within engagement apparatus 120, floor panel 102 is accurately positioned within stamping cart 106. Such alignment and positioning enables floor panel 102 to be properly sealed when positioned within stamping cart 106. It is to be understood that operations other than sealing may be performed when the component 102 aligned in the first and second directions. Examples of operations include, but are not limited to, welding, milling, or cutting of the component 102, coating or painting of the component 102, and attachment or assembly of the component 102 to another piece.

As compared to known automated systems that are used to transfer machine components, such as automobile front floor panels, the embodiments described herein provide an automated system that facilitates proper alignment of components within an assembly line without the use of pins. More specifically, the embodiments described herein provide a component engagement apparatus for use in automated systems. The exemplary engagement apparatus includes a main body and at least one retaining member coupled to the main body. The retaining member is configured to couple a component, such as a front floor panel, to the engagement apparatus such that the panel is retained within the component engagement apparatus in a first predefined position. A plurality of alignment members are coupled to the main body such that each of the alignment members are positioned a predefined distance from the retaining members. The alignment members align the panel within the engagement apparatus when the panel moves, via gravity, from the first predefined position to a second predefined position. By using the alignment members, pins are no longer inserted into openings formed in the panels. Moreover, the alignment members enable the panel to be properly aligned within the engagement apparatus. When a component, such as the floor panel, is properly aligned within the engagement apparatus, the floor panel may be accurately aligned within a stamping cart such that the floor panel is properly sealed therein. Accordingly, down time associated with work drops within the assembly line is facilitated to substantially decrease, while the overall efficiency of the assembly line may substantially increase.

Exemplary embodiments of the apparatus, systems, and methods are described above in detail. The apparatus, systems, and methods are not limited to the specific embodiments described herein, but rather, components of the apparatus and systems and/or steps of the methods may be utilized independently and separately from other components and/or steps described herein. For example, the apparatus and systems may also be used in combination with other systems and methods, and is not limited to practice with only the apparatus and systems as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A component engagement apparatus for use in automated systems, said component engagement apparatus comprising:
    a main body selectively rotatable between a first position and a second position, wherein said main body comprises a first end portion, a middle portion, and a second end portion;
    at least one retaining member coupled to said main body, said at least one retaining member is configured to couple a component to said component engagement apparatus such that the component is retained within said component engagement apparatus in a first predefined position; and
    a plurality of alignment members coupled to said main body such that each of said plurality of alignment members are positioned a predefined distance from said at least one retaining member, said plurality of alignment members are configured to align the component within said component engagement apparatus when the component moves, via gravity, from the first predefined position to a second predefined position, wherein at least two of said plurality of alignment members are coupled to said main body second end portion, and at least four of said plurality of alignment members are coupled to said main body middle portion.

2. A component engagement apparatus in accordance with claim 1, wherein said at least one retaining member is further configured to retain the component within said component engagement apparatus when the component is being moved from a first cart to a second cart that are each positioned on a planar surface, said at least one retaining member is configured to couple the component to said component engagement apparatus such that the component is retained within said component engagement apparatus in at least one of a substantially horizontal position with respect to the planar surface and a vertical position with respect to the planar surface.

3. A component engagement apparatus in accordance with claim 2, wherein said plurality of alignment members align the component within said component engagement apparatus such that the component is aligned within the second cart.

4. A component engagement apparatus in accordance with claim 1, further comprising at least one engagement device coupled to said main body, said at least one engagement device is configured to adhere at least a portion of the component to said component engagement apparatus.

5. A component engagement apparatus in accordance with claim 1, wherein said plurality of alignment members are coupled to said main body such that at least one of said plurality of alignment members is in contact with at least a portion of the component when the component is retained within said component engagement apparatus.

6. A component engagement apparatus in accordance with claim 1, wherein said plurality of alignment members are coupled to said main body such that at least a portion of each of said plurality of alignment members are substantially perpendicular to said main body.

7. A component engagement apparatus in accordance with claim 1, wherein each of said plurality of alignment members comprises a substantially planar surface.

8. A component engagement apparatus for aligning a component in two directions, said apparatus comprising:
    a main body rotatable from a first position to a second position;
    at least two arms extending from said main body to define a channel therebetween that receives a portion of the component therein to align the component in a first direction when said main body is in the first position;
    at least one engagement device extending from said main body, wherein said at least one engagement device selectively secures the component to said main body when the component is aligned in the first direction, and releases the component when said main body is in the second position to enable the component to move parallel to a longitudinal axis of the channel; and
    a finger extending from said main body and positioned to receive the moving component at a point where the component is aligned in the second direction.

9. An apparatus in accordance with claim 8, wherein the first direction is substantially perpendicular to the second direction.

10. An apparatus in accordance with claim 8, wherein the longitudinal axis of the channel is substantially parallel with a planar surface when said main body is in the first position.

11. An apparatus in accordance with claim 8, wherein the distance between each of said at least two arms adjacent said main body is less than the distance between each of said at least two arms adjacent the end of each of said at least two arms.

12. An apparatus in accordance with claim 11, wherein said at least two arms form a substantially v-shaped channel.

13. An apparatus in accordance with claim 8, wherein said at least one engagement device engages the component and retracts the component toward said at least two arms such that said at least two arms guide the portion of the component in the channel as the component is being retracted to align the component in the first direction.

14. An apparatus in accordance with claim 13, wherein said at least one engagement device engages the component via a vacuum.

15. An apparatus in accordance with claim 8, wherein said at least one engagement device is a clamp.

16. An apparatus in accordance with claim 8, further comprising a clamp secured to said main body that secures the component to said main body when the component is aligned in the first direction, and releases the component when said main body is in the second position.

17. An apparatus in accordance with claim 8, wherein said finger is positioned outside of the channel.

18. A method of using a component engagement apparatus to align a component in two directions, said method comprising:
- rotating a main body from a first position to a second position;
- receiving a portion of the component within a channel defined between at least two arms extending from the main body to align the component in a first direction when the main body is in the first position;
- securing the component selectively, via at least one engagement device, to the main body when the component is aligned in the first direction;
- releasing the component when the main body is in the second position to enable the component to move parallel to a longitudinal axis of the channel; and
- receiving the moving component at a point where the component is aligned in the second direction, via a finger that extends from the main body.

* * * * *